Inventor:
Arthur A. Berndt,

Patented Apr. 20, 1937

2,078,051

UNITED STATES PATENT OFFICE 2,078,051

CONNECTER FOR STRANDED CABLE

Arthur A. Berndt, Chicago, Ill., assignor to Electroline Corporation, Chicago, Ill., a corporation of Illinois Application April 11, 1935, Serial No. 15,769

3 Claims. (Cl. 173—303)

The invention relates to connecters and particularly to electrical connecters for joining stranded wires.

Connecters of the type to which the present invention relates are constructed to permit hand insertion of the ends of the wires which are joined to the connecters by gripping members housed within tapered end portions thereof. The shell and gripping members cooperate in joining a cable or wire to the connecter so that the tension longitudinally thereof will act to proportionately increase the gripping or holding action as the tension increases. The connecter is preferably constructed of metal having a high conductivity and as the same houses all its parts within the shell they can not become lost and a light and compact article results.

In joining stranded wires or cables to connecters such as described difficulty has been experienced in that the outer strands of the cable separate and flare outwardly, making it impossible at times to insert the cable within the end of the connecter. Also the gripping members are arranged in sets of two or more and insertion of a stranded cable having strands tending to spread or flare outwardly often results in a strand entering the space between the members, thus interfering with their normal operation and preventing a secure joint between the connecter and cable.

The invention aims to overcome the above difficulties in joining stranded wires or cables by providing the ends of the connecter with retaining rings to thereby confine the outer strands and keep them from spreading and which rings can be removed when the cable is released from the connecter and the joint disassembled, permitting reclaiming of the rings for future use or for salvage purposes.

Another object of the invention is to provide a retaining ring which will have a tight fit with the end of the stranded cable to be inserted in a connecter and which will have association with the bevelled edges of the gripping members to prevent interference with the insertion of said end of the cable.

With these and other objects in view the invention may consist of certain novel features of construction and operation, as will be more fully described and particularly pointed out in the specification, drawing and claims appended hereto.

In the drawing which illustrates an embodiment of the invention and wherein like reference characters refer to like parts—

Figure 1:
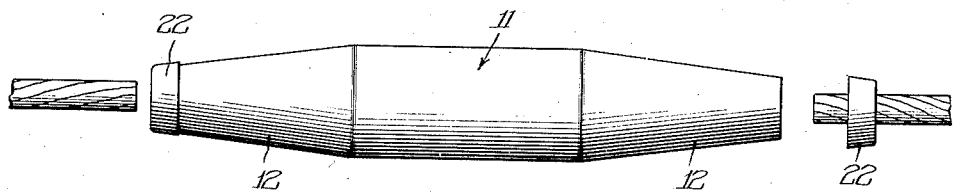
Figure 1 is an elevational view of a connecter for joining stranded wires or cables, showing the same equipped with the retaining rings of the invention.
Figure 2:
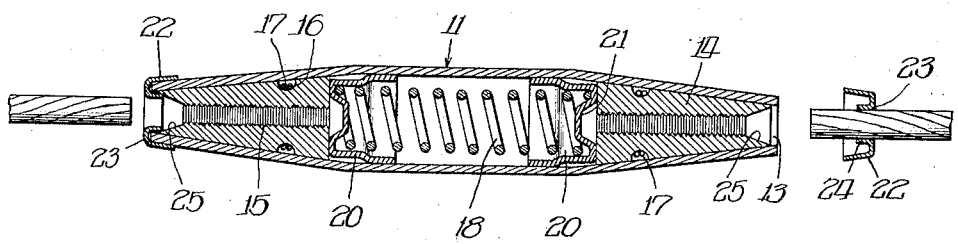
Figure 2 is a sectional view taken longitudinally of the connecter and retaining rings as shown in Figure 1.
Figure 3:
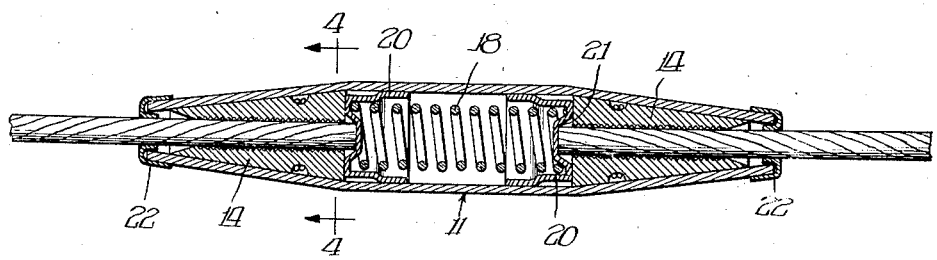
Figure 3 is a sectional view showing the connecter and rings of the invention with stranded wires joined to the respective ends thereof.
Figure 4:
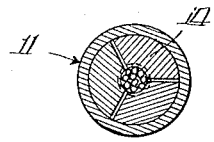
Figure 4 is a transverse sectional view taken substantially along line 4—4 of Figure 3.

The connecter shown in the drawing is similar in construction and in operation to the line splices disclosed and claimed in applicant's co-pending application, Serial No. 712,597, filed February 23, 1934. The same consists of a tubular housing or casing 11 of any suitable metal, preferably copper or an alloy thereof, having tapering end portions 12 on the respective ends thereof, each being provided with an opening 13 of reduced diameter compared with the size of the cylindrical portion of the casing. The walls of the casing in the vicinity of the end openings are slightly greater in thickness than the casing wall at the other points since the extreme outer end of the casing is called upon to withstand severe strains due to the tension placed upon the wire connected thereto.

Located within the casing are two sets of gripping members, each set consisting of two or more members having contact with the tapering walls of a portion 12. Each member 14 is of wedge-shaped formation and is formed with a trough or groove extending lengthwise thereof and suitably roughened by means of teeth 15. Each member is also provided on its exterior surface with a transverse groove 16 for receiving several strands 17 of spring wire for yieldingly holding the members in associated relation to form a set of two, three or four, as the case may be.

For maintaining the gripping members in contact with the tapering walls of the end portions a coil spring 18 is located within the casing and confined between the sets of gripping members. The spring has convolutions of a diameter somewhat less than that of the casing so as to have free movement within the casing and has a length to exert sufficient tension to make an operative connecter. Between the respective ends of the coil spring and associated gripping members there is located a cup-shaped member 20 provided with a base recessed at 21 for centering the wire held by the gripping members and having an exterior surface which increases in diameter from the base to the open end for purposes which will presently appear. The height of each cup-shaped member is designed to prevent full compression of the coil spring 18. The insertion of a wire or cable within an open end 13 of the connecter will force the gripping members rearwardly away from their tapering walls and will cause the members to separate against the tension of the spring wire 17, permitting passage of the end of the wire which thus becomes associated with the members. The operation results in the wire contacting with member 20 and in movement of the member rearwardly, causing compression of the coil spring 18. In most instances the act of joining a wire to the connecter will cause one cup member to contact the other, whereupon further compression of the spring is of course impossible.

It is also noted that the diameter of the base portion of the cup-shaped member 20 is considerably less than the interior diameter of the cylindrical portion of the casing, whereas, the diameter of the cup from the center to rim is somewhat larger and has a slidable fit with the cylindrical portion. The reduced diameter of the base portion of the cup member is necessary as this portion should fit within the tapering end section of the casing when the gripping members are in inoperative position in order to give maximum longitudinal movement for the spring and gripping members. The large diameter of the cup controls the slidable movement of the same during compression of the spring in the act of inserting the wire.

The ends of the stranded wires or cables to be joined to the connecter described are unconfined after they have been cleaned and the insulation removed. The strands going to make up the wire or cable are therefore free to spread or flare outwardly which happens very frequently to the discomfort of the workman making the joint.

To hold the strands of the wire or cable so that they will be prevented from flaring outwardly until the end is inserted within the connecter the invention provides a retaining ring designated in its entirety at 22 and which is made of any suitable metal, preferably of the same metal as that of the connecter. The ring has an outer periphery of tapering contour to conform to the tapering portions 12 so that the ring will neatly fit the tips of the connecter. The metal forming the central opening in the ring is rounded at 23 and continues inwardly to form a lip or flange 24. The construction of the ring therefore facilitates the entrance and insertion of a stranded wire or cable through the opening in the ring and to carry out this same feature the ends of the gripping members 14 are bevelled at 25. It will be noted that the bevelled edges are located under the inwardly directed lip 24 of the retaining rings when they are fitted to the tips of the connecter. The end of the stranded wire or cable being inserted within the connecter therefore has free and unobstructed passage and the trouble heretofore encountered due to the flaring of the strands is entirely eliminated.

The connecters are provided with a ring fitted to each end thereof. The tapering circumference of the ring conforms substantially to that of the end portions of the connecter although a tight fit between the parts is preferred to hold the ring in place, which, however, can be removed by the workman. Before inserting the cable or wire within the opening in the connecter the ring can be removed and placed on the wire near the end thereof so as to retain the strands close together and prevent the outer strands from flaring. Another method is to leave the retaining ring on the connecter and insert the wire or cable through the opening in the ring, which will properly direct the same into contact with the gripping members, the passage of the cable through the ring operating to hold the strands in confined relation so that a secure connection with the gripping members results. The rounded section of metal indicated by 23 forms a flaring entrance for the opening in the ring, which opening continues in a direction rearwardly to provide the lip or flange 24. The function of the lip is to overlie the bevelled edges of the gripping members so that the edges of the same will not obstruct or interfere with the entrance of a cable.

The invention is not to be limited to or by details of construction of the particular embodiment thereof illustrated by the drawing, as various other forms of the device will of course be apparent to those skilled in the art without departing from the spirit of the invention or the scope of the claims.

What is claimed is:

1. A stranded wire connecter including a tubular casing having its ends tapered to form tapering end portions, a set of gripping members located within each end portion and engaging the tapering end walls thereof, means positioned between the sets of members for maintaining them in contact with their respective walls, each set of gripping members having a bore longitudinally thereof for receiving the wire inserted in the connecter, the wire receiving opening in each set of members being bevelled, and a retaining ring fitted to each end of the connecter, said rings having a flange extending rearwardly from the opening therein and overlying the bevelled edges of the gripping members.

2. A stranded wire connecter including a tubular casing having its end portions reduced in diameter to form tapering end portions, a set of gripping members housed within each end portion and engaging the walls thereof respectively, each set of gripping members having a bore longitudinally thereof for receiving the wire inserted in the casing, resilient means located between the sets of gripping members for holding them in contact with the walls of their end portion, and a retaining ring fitted to one end of the connecter, said ring having a tapering circumference conforming to the taper of the end portion of the casing, and the opening in the ring having a flaring entrance for directing and facilitating the insertion of a stranded wire cable.

3. A stranded wire connecter including a tubular casing having its end portions reduced in diameter to form tapering end portions, a set of gripping members housed within each end portion and engaging the walls thereof respectively, each set of gripping members having a bore longitudinally thereof for receiving the wire inserted into the casing, the wire receiving opening of each set being bevelled, resilient means located between the sets of gripping members for holding them in contact with the walls of their end portion, and a retaining ring fitted to each end of the connecter, each ring having a tapering circumference to conform to the tapering end portion of the connecter, the opening in the ring having a flaring entrance and the metal forming said opening continuing rearwardly to provide a lip overlying the bevelled edges of the gripping members, whereby said retaining ring will hold the strands of wire in confined relation and will direct said wire into contact with the gripping members.

ARTHUR A. BERNDT.